United States Patent [19]
Helbing

[11] Patent Number: 5,601,629
[45] Date of Patent: Feb. 11, 1997

[54] APPARATUS FOR PRODUCING A FIBERGLASS PACK WITH TWO STEPS OF BINDER APPLICATION

[76] Inventor: Clarence H. Helbing, 1315 Hale Rd., Shelbyville, Ind. 46176

[21] Appl. No.: 357,000

[22] Filed: Dec. 16, 1994

Related U.S. Application Data

[60] Continuation-in-part of Ser. No. 147,658, Nov. 5, 1993, abandoned, which is a division of Ser. No. 998,126, Dec. 29, 1992, Pat. No. 5,324,337.

[51] Int. Cl.$^6$ .................................................. C03B 37/00
[52] U.S. Cl. .................. 65/529; 65/530; 65/532; 118/106; 118/314; 156/62.4; 156/167; 156/181; 156/441
[58] Field of Search ............................ 65/529, 530, 532; 118/314, 106; 156/62.2, 62.4, 167, 166, 181, 441

[56] References Cited

U.S. PATENT DOCUMENTS 4,288,475  9/1981  Meeker ........................ 427/389.8

*Primary Examiner*—John Hoffmann
*Attorney, Agent, or Firm*—Baker & McKenzie

[57] ABSTRACT

A fiberglass product usable as an end product or an intermediate product is formed as a pack in a forming station but only 1/5th of the conventional quantity of binder is applied. After curing to a self-sustaining form, additional binder is added in an amount in excess of the amount required in the final product and then the excess binder and moisture is removed by one or more stripping steps. Additional moisture is removed by electronic means to the desired moisture level for commercial products.

7 Claims, 4 Drawing Sheets

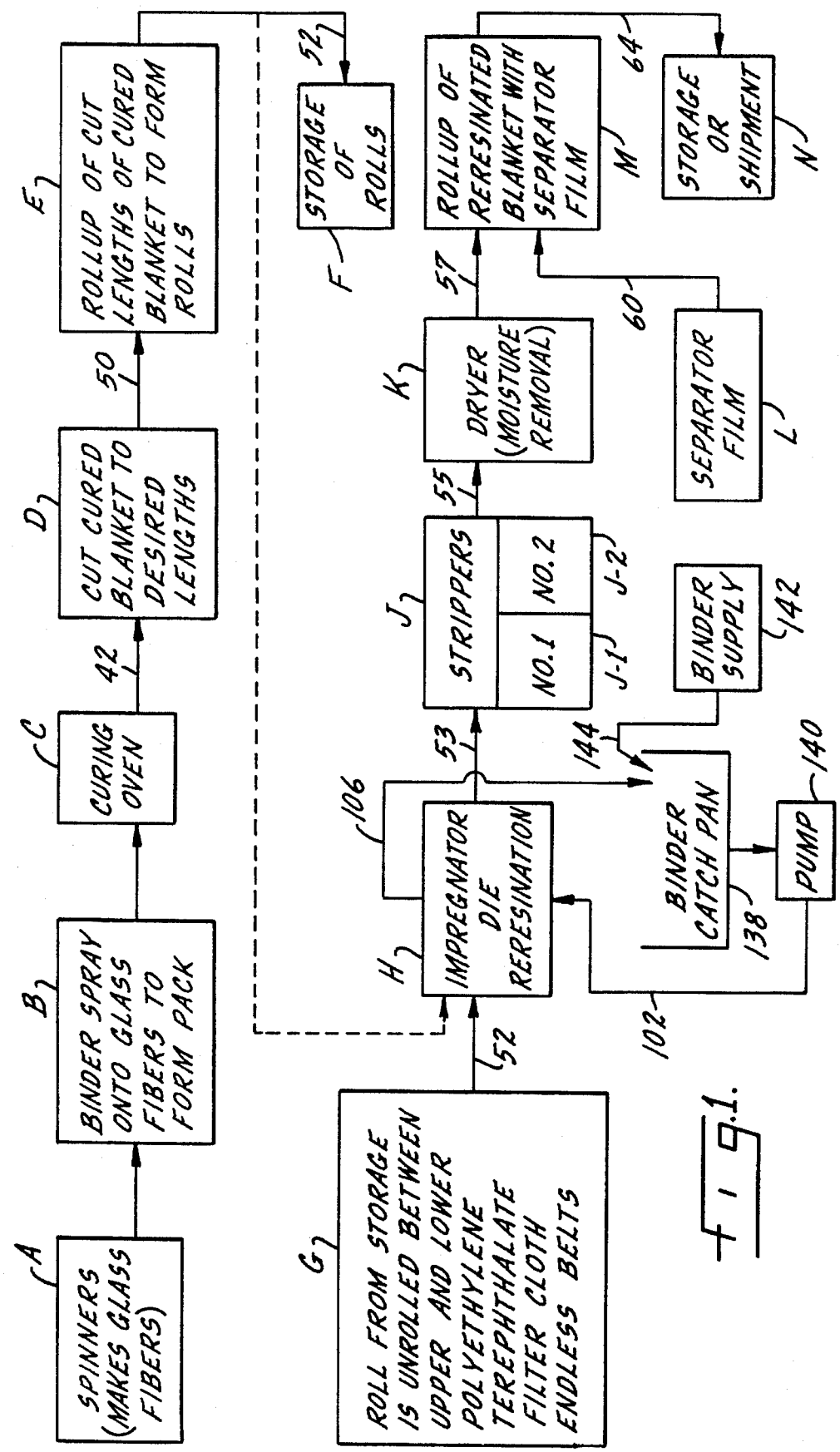

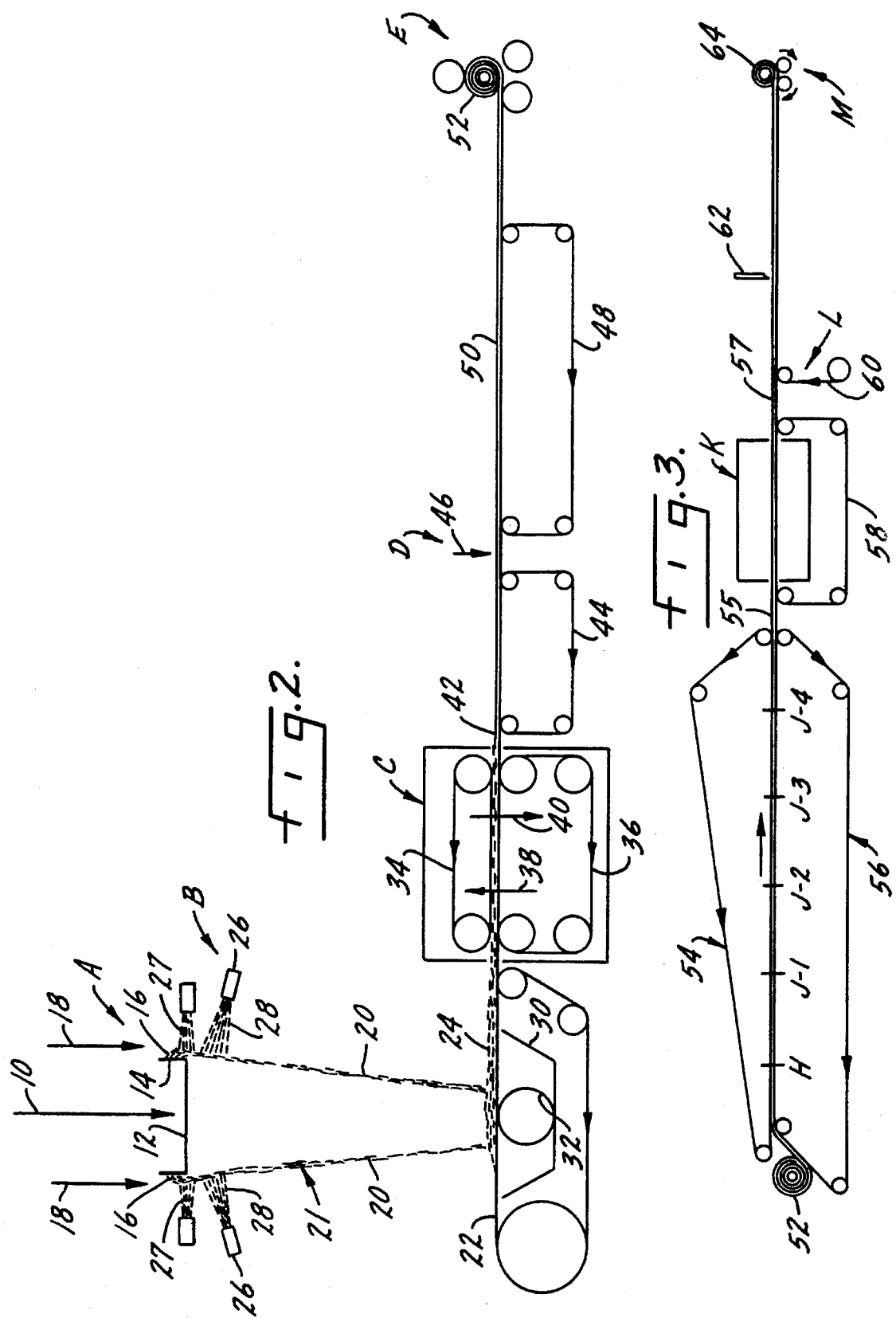

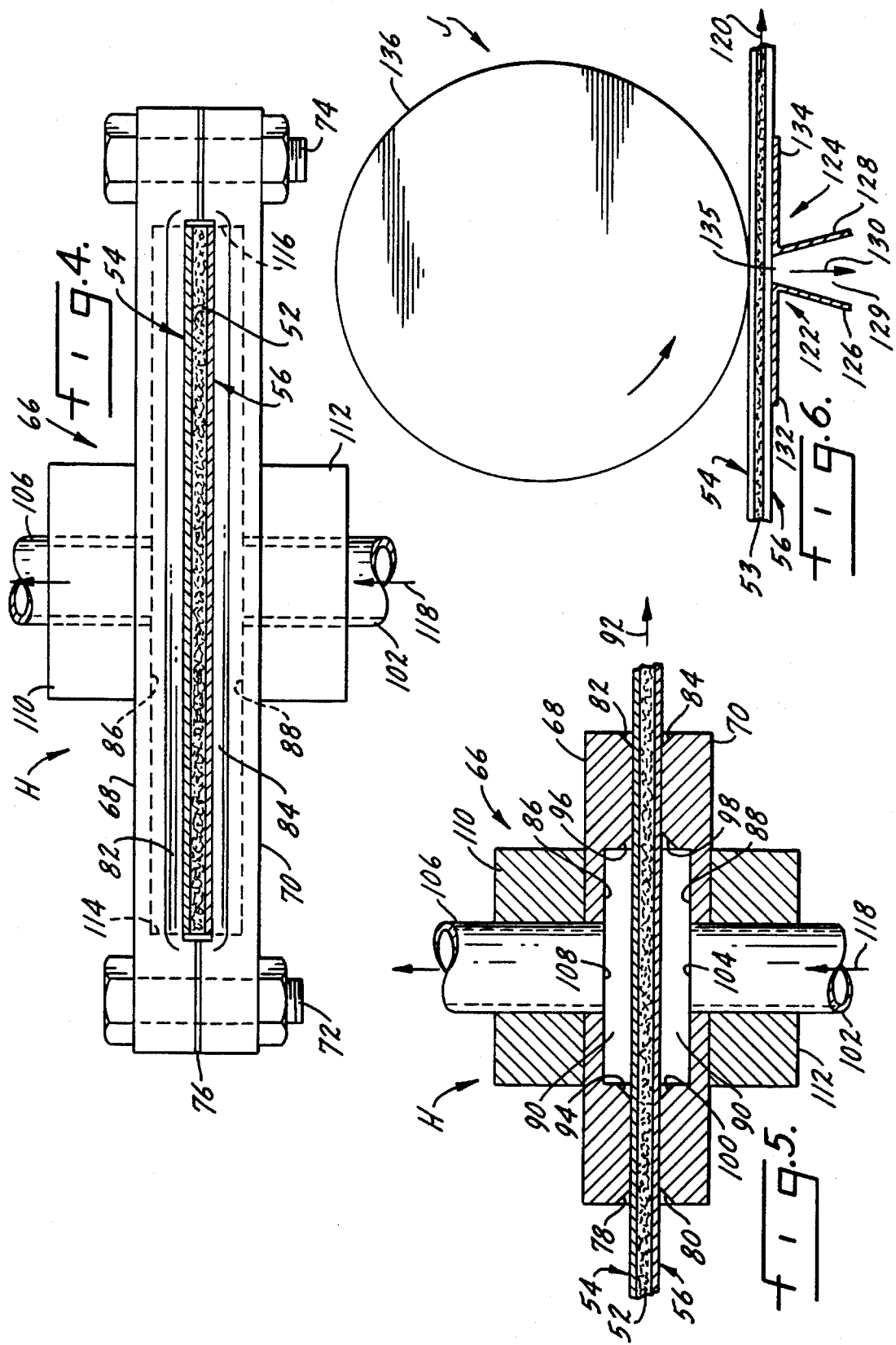

APPARATUS FOR PRODUCING A FIBERGLASS PACK WITH TWO STEPS OF BINDER APPLICATION

This application is a Continuation-in-part of application No. 08/147,658, now abandoned which is a divisional of application Ser. No. 07/998,126, now U.S. Pat. No. 5,324,337.

FIELD OF THE INVENTION

This invention pertains to a specialty fiberglass product and a method and apparatus for producing it. More specifically, it pertains to a fibrous product especially useful as a component in subsequently manufactured products, such as a roof liner for automobile interiors. Further, the invention pertains to the manufacture of such products by a method which substantially eliminates pollution problems associated with the application of binder to the hot fibers in the rotary spinner disc method of making fiberglass products while, at the same time, converting a higher percentage of the expensive binder component into useful product.

BACKGROUND AND SUMMARY OF THE INVENTION

The partially cured fiberglass product of the present invention is capable of being used in its as-manufactured condition or as a shaped component of a subsequently manufactured product. Typically, the uncured fiberglass product is later cured in a heated press to form a shaped or board-like product. To appreciate the advance in the art provided by the present invention, the conventional rotary spinner fiberglass process will be described as a reference.

In broad outline, a fiberglass pack is formed from molten glass which is dropped onto a rotating spinner disc and the glass thereafter formed into small diameter streams of molten glass as it leaves the spinner disc through fine holes formed in the disc walls under the influence of centrifugal force. The streams of glass are then attenuated into fibers by a blast of hot gases which direct the fiber veil downward toward a takeaway conveyor. A binder, usually a thermosetting resin, is sprayed onto the falling veil of fibers so that a pack of fibers with binder applied thereto forms on the conveyor. The pack with binder applied thereto must be later heated in a curing press by a customer or purchaser of the product. The binder, upon fully curing, will bind the fibers one to the other to form a fully self-sustaining article which is usually a flat or shaped, board-like product.

Vaporization of the binder at the forming station is a significant problem because state and federal environmental regulations generally prohibit the release of vaporized binder into the atmosphere. To alleviate this problem, manufacturers spray water or another cooling fluid on the hot fiber veil at the forming station to cool the hot fibers before the application of binder. However, the fibers are still hot even after the application of water and therefore the application of binder to the hot fiber veil results in the vaporization of binder resulting in undesirable fumes. Further, the water and some of the binder, is removed from the pack on the air pervious takeaway conveyor located in the forming station. The undesirable fumes resulting from the vaporization of binder at the forming station require expensive pollution control equipment to remove the binder from the forming station gases prior to discharge of forming station gases to the atmosphere.

Binder application in the forming station in a desired amount of about 18% by weight of the fiberglass is typical of this process.

The instant invention differs from the above described conventional process and substantially alleviates the environmental concerns associated with vaporized binder in that a first amount of binder in an amount that approximates only about ⅓th of or substantially less than the desired amount of binder applied in a conventional process is applied at the forming station. Thereafter, in contrast to the conventional process described above, the pack is cured in an oven or a curing station so that a self-sustaining blanket is formed upon emerging from the curing station. The resulting low binder blanket is a feed blanket to which supplemental binder is later added. As a result, far lower quantities of binder and water are removed at the forming stations when making the low binder blanket and similarly small quantities of binder are removed at the curing station so that the treatment of the excess binder and other waste is greatly simplified. Further, it is believed that the process of the present invention can be carried out at a higher efficiency than the prior art process discussed above.

Additional supplemental or "second" binder which is needed to form a useful self-sustaining final product is added to the blanket after the "first" or preliminary application of binder has been made at the forming station and after the pack has been cured to form a blanket. Since the amount of the second or make-up binder cannot be added with great precision under production line conditions, an excess of the second binder is added at an impregnation or re-resination station. However, applying excess second binder to the cool blanket does not create pollution problems because the excess second binder can be removed or stripped by application of vacuum or a pressure drop to the moving blanket at a stripper station. The excess second binder that is removed may also be recycled.

It is preferred that the second binder be in a liquid form and substantially foam-free so as to enhance the ability of the stripper to remove excess amounts of second binder from the moving blanket. The use of a plurality of strippers enables the final binder content to be controlled to a desired level. Since the second binder is preferably applied at room temperature, the effluent handling problem is greatly simplified over the effluent handling conditions which exist at the conventional forming station. By the same token, since the stripper action removes only excess second binder applied at the re-resination station, the excess second binder can be applied and thereafter removed at room temperature and can be conveniently recycled. With proper configuration, a closed system can be utilized which eliminates nearly all atmospheric discharge and hence avoids or greatly reduces pollution concerns.

Depending on such cost factors as the cost of the additional, non-conventional equipment required and the throughput of a given line, all of the above may be accomplished at lower cost per unit of product produced than is experienced with current conventional techniques used to produce the same or functionally equivalent products.

BRIEF DESCRIPTION OF THE INVENTION

The invention is illustrated more or less diagrammatically in the accompanying drawing in which FIG. 1 is a flow diagram of the unique process for producing the specialty low binder fiberglass product of this invention;

FIG. 2 is a schematic disclosure of the forming, curing, cutting and roll-up portions of the method of the present invention;

FIG. 3 is a schematic disclosure of the re-resination portions of the method of this invention;

FIG. 4 is an end view of the impregnation die in the re-resination section of the system;

FIG. 5 is a longitudinal sectional view through the re-resination section of the system;

FIG. 6 is a partly diagrammatic longitudinal cross-section through a vacuum stripper section designed in accordance with the present invention.

Figure 7:
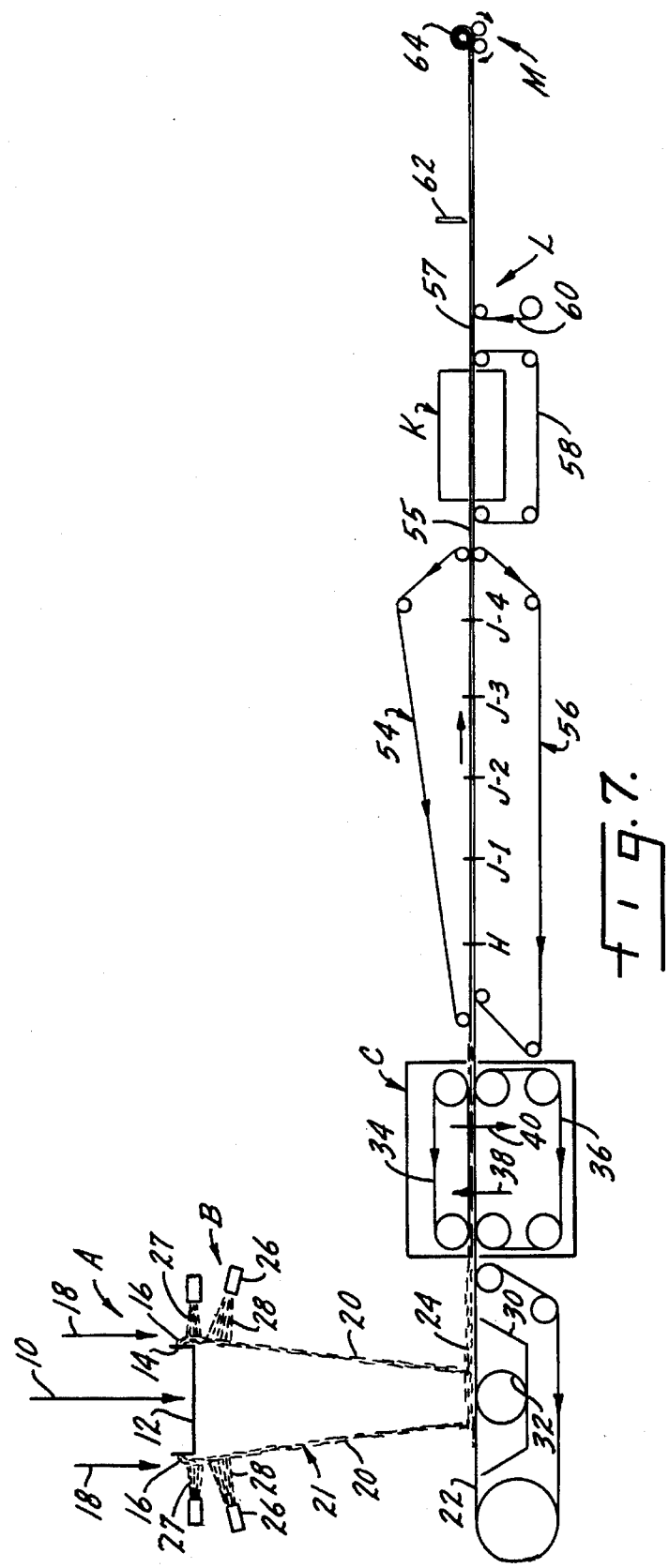
FIG. 7 is a schematic disclosure of the method of the present invention as practiced as a continuous process.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the present invention is not necessarily limited to the particular embodiments illustrated herein.

DETAILED DESCRIPTION OF THE INVENTION

Like reference numerals will be used to refer to like parts from Figure to Figure throughout the following detailed description of the invention.

The invention will be described by referring to FIGS. 1 and 2 collectively and by referring to FIGS. 1 and 3 collectively.

FIG. 1 is a flow diagram illustrating the present invention starting at the forming Station A, or just after the furnace forehearth, and ending at the storage or shipment Station N. It will be understood that the rolls provided at the storage Station N will be further processed. Station A is a conventional forming station, the essential details of which are also illustrated in FIG. 2. Referring now to FIG. 2, a stream of molten glass 10 drops down onto a rotating spinner disc indicated at 12. The spinner disc includes a side wall 14 with a large number of very fine holes (not shown). The stream of molten glass 10 hits the disc 12 and moves outwardly toward the periphery of the disc and then is broken up into a plurality of streamlets of molten glass indicated at 16 as the glass moves through the fine holes in the disc side wall 14 under the impetus of centrifugal force. A downwardly directed blast of hot gases indicated at 18 then strikes the hot streamlets 16 at right-angles. The blast of hot gases indicated at 18 attenuates the streamlets of glass 16 into fibers shown generally at 20 and the fibers form a downwardly falling veil indicated generally at 21. The veil 21 falls onto first conveying means, here a porous forming conveyor 22, and forms a pack indicated at 24 on top of the conveyor 22.

Referring back to FIG. 1, at Station B, a binder, usually a thermosetting resin, is sprayed on the downwardly falling veil of fibers 21. By applying binder to the fibers 20, the pack 24 with binder applied thereto can later be formed into a self-sustaining blanket. Station B is generally illustrated in FIG. 2 at the spray nozzles indicated at 26 which spray a mixture 28 of binder and water onto the downwardly falling veil of fibers 21. It will be noted also that a spray of cooling water 27 disposed above the spray nozzles 26 may be employed so that the fibers 20 are cooled somewhat before the application of the binder/water mixture 28. The use of the cooling spray 27 helps alleviate the pollution problems caused by the vaporization of the binder at the forming station as discussed above.

In a conventional binder application system, resin and its carrier, usually water, are applied to the falling veil 21 of fibers in an amount up to about 18% by weight of the resulting pack 24. In this system as little as about ⅕th of that amount of binder and carrier is applied to the downwardly falling veil of fibers. No definitive amount of resin and carrier can be stated since the amount required will vary due to many factors including the ratio of resin to its carrier water, the curing capacity of the curing oven, the final product desired, and others. As a minimum the amount of resin added should be sufficient to ensure that the blanket which emerges from the subsequent curing oven is self-sustaining or cohesive to the point where it can be cut and formed into rolls without deleterious degradation of the product.

As the pack 24 is carried away on the forming conveyor 22, a vacuum or pressure drop is applied to the undersurface of the pack 24 through the air pervious conveyor 22. As shown at FIG. 2, this is accomplished with the use of a suction box 30 which draws gases downward through the pack 24 and forming conveyor belt 22 into the suction box 30. A suction duct is indicated at 32 which serves as an exhaust conduit for the hot gases being drawn into the suction box 30. Hence, a portion of the binder/water mixture 28 will be drawn off into the suction box 30 as effluent. This amount of binder/carrier 28 drawn off into the suction box 30 may be on the order of about 20% of the amount applied to the veil of fibers 21 by the nozzles 26, but this value is given as an exemplary value only and the actual quantity of binder/carrier drawn off at the suction box 30 may be greater or less. The pack 24 may be of the desired thickness and width depending on the glass feed rate to the spinner disc 12, the speed of the forming conveyor 22 and the distribution pattern of the fibers 20 on the forming conveyor 22. Convenient sizes might, for example, be 1 pound ×1 inch to 2.5 pounds ×1 inch product on 48 inch to 60 inch wide conveyors. In any event, the amount of water and binder 28 drawn off between Stations A and B is substantially less than in a conventional process due to the relatively small amount (about ⅕th of the desired amount) of binder/carrier 28 which is applied to the falling veil of fibers 21 at Station B.

The pack 24 to which a first or preliminary binder application has been made is moved downstream to means for curing the partially bindered fiberglass pack, here a curing oven at curing Station C. The rate of cure can vary as desired or as dictated by system parameters but, in any event, a self-sustaining blanket of glass fibers is formed. The fibers are bound to one another by a cured binder to a degree sufficient for further processing.

The curing Station C is illustrated in more detail FIG. 2. Specifically, the pack 24 is sandwiched between second conveying means, here an upper curing oven conveyor 34 and a lower curing oven conveyor 36. Hot curing oven gases flow upward through the conveyor 36, the pack 24 and the conveyor 34 in the direction of the arrow shown at 38. Hot curing oven gases are then blown downward through the belt 34, the pack 24 and the belt 36 in the direction of the arrow shown at 40. The self sustaining blanket shown at 42 leaving the curing oven Station C is only partially bindered but fully cured and yet is sufficiently bindered and cured to form a self sustaining blanket 42.

Still referring to FIG. 2, third conveying means, here a conveyor 44 transports the blanket 42 to a chopper 46 which is also illustrated at Station D in FIG. 1. At Station D, the chopper 46 cuts the partially bindered fiberglass blankets 42 into desired lengths for further processing. Of course, if a continuous process is desired, Station D and the chopper 46 can be eliminated, at least at the location illustrated in FIG. 1.

The conveyor 48 transports the cut blankets 50 to Station E, where the cut lengths 50 are formed into rolls 52 by means well-known in the art. After roll up, the resulting rolls 52 are then placed in storage at Station F until they are needed for further processing in accordance with the invention. At a later time, which may be a very short or a very long time period, a roll 52 is unrolled at Station G preparatory to further processing.

It will be understood that the preferred method of carrying out the present invention is to include the cutting Station D, the roll Station E and the un-rolling Station G with the storage Station F, if necessary. However, it will be understood that those skilled in the art could design a continuous process which eliminates any or all of Stations D, E, F and G. A continuous process, however may very well include cutting the blankets 42 at a Station located far the downstream D because of the most likely end use of this product, which is a shaped or flat fiberglass board-like product. If a continuous process is designed, however, the self-sustaining blanket 42 emerging from the curing oven at Station C must be cooled before the binder is applied thereto at Station H (see FIG. 1).

Still referring to FIG. 1, as noted above, the product shown at 42, 50 or 52 is still only partially bindered. Accordingly, as shown in FIG. 3, the partially bindered rolled product 52 is removed from storage and fed between an upper belt 54 and lower belt 56 which comprise a fourth conveying means. Preferably, the belts 54, 56 are fabricated from polyethylene terephthalate filter cloth for reasons disclosed below. The unrolled blanket which is sandwiched between the upper and lower belts 54, 56 then enters post curing supplement binder application means, here the impregnator die which is indicated at Station H in FIGS. 1 and 3. At Station H, a second or supplemental quantity of binder is added to the blanket 52, preferably, but not necessarily, at near ambient temperature conditions so that the supplemental binder will not vaporize upon contact with the blanket product 52. As noted above, in a continuous process, any one or all of Stations D, E, F and G may be eliminated so long as the self-sustaining blanket emerging from the curing oven at Station C is cool before the second binder is applied at Station H. Such a continuous process is disclosed diagrammatically in FIG. 7.

As a practical matter, a greater amount of resin will be added at station H than is required in the final product because the addition process is difficult to control precisely. It is therefore far more efficient to add too much binder, and thereafter remove the unneeded excess by stripping stages until the final content is achieved, rather than add too little binder and then reprocess the blanket again through the system or subject the blanket to a second re-resination procedure. The specific function of the re-resination station will be described in detail hereinafter. Although the weight of binder in the blanket per unit of area may vary widely, an amount on the order of about 600 grams of binder per square foot of blanket may be utilized.

Very shortly after exiting the re-resination Station H the re-resinated blanket 53, still sandwiched between the belts 54 and 56 as shown in FIG. 3 and now holding binder in an amount in excess of the final desired amount, enters means for stripping binder in excess of the final amount from the blanket, here the vacuum stripper Station J. Preferably the means for stripping at the vacuum stripper Station J includes a plurality of vacuum strippers of which two are indicated in FIG. 1, each of which is effective to remove a portion of the excess unneeded binder and its carrier. Again, no standard amount or even a range of quantities removed can be stated because of system variables. If a blanket 53 exiting the re-resination station contains about 600 grams of resin per square foot, the blanket 55 leaving stripper number J-1 may be characterized by about a 20–25% LOI and about 30–35% moisture, and the blanket leaving stripper number J-2 may be characterized by about a 20–25% LOI and about 20–25% moisture.

It will be understood that any number of strippers may be employed, the only requirement being that a sufficient number be available so that the final resident binder and moisture is at the desired level. In FIG. 3 room has been provided for two additional strippers as indicated by J-3 and J-4.

After leaving the stripper Stations J-1 through J-4, the blanket product 55 is transported by the conveyor 58 (see FIG. 3) to means for removing excess moisture, here the drier Station K (see FIGS. 1 and 3). For the re-resination process of the present invention, it is been found experimentally that in order to get the binder content of the final product up to the desired amount of 18% by weight, a binder/carrier mixture with a lower solids content of only about 25% can be utilized in the re-resination process. With only a 25% solids content of the binder/carrier mixture, additional moisture will be present in the product 55 leaving the final stripper station indicated at J-4 in FIG. 3. Accordingly, the drying Station K will be necessary for most binder/carrier mixtures to remove excess moisture without substantial additional curing of the uncured binder. It is important for most applications to provide at least a partially cured final product exiting the stripper station J and therefore little or no curing of the second binder application should take place at the drying Station K.

Accordingly, one preferred method of drying the blanket product 55 at Station K is to employ a microwave oven. In test samples, it has been found that to achieve a final moisture content of only 5%, the re-bindered product 55 could be heated for approximately 3 minutes and 45 seconds at power setting number 10 in a conventional microwave oven such as a General Electric household microwave oven Model No. JE 1445 001. Accordingly, stronger ovens will require a shorter cooking time to achieve the same final desired moisture content which is preferably in the range of 4% to 6% but may be lower or higher depending upon the requirements of the final product.

It will also be understood that intermittent drying might be preferable than one continuous drying process. For example, using a conventional microwave oven, it was found that the appropriate drying time on power level 10 is approximately four minutes. In some samples, the binder was over cured toward the center of the blanket resulting in unwanted hardness. Therefore, intermittent treatment using periods of one to two minutes each, can alleviate the "hard cure" in the middle of the blanket. Of course, the time period used for the electronic or microwave dryer at Station K and the need for intermittent periods of drying will depend largely upon the binder, the carrier and the final moisture content desired.

Upon leaving the dryer Station K, a separator film 60, indicated at film Station L, is added to the unrolled re-resinated and dried blanket 57 just prior to roll up in Station M. Forming the blanket 57 into rolls facilitates storage or shipment and handling or at a subsequent processing station at a remote location. If desired, the blanket 57 may be cut, as indicated by cutting mechanism 62, so that rolls of a small diameter and thus a more convenient size for subsequent handling are formed at 64 of Station M.

At Station N the rolls which have been processed in accordance with this invention are either stored or shipped to an off-site location. It will also be understood that storage at Station N may be eliminated if production requirements justify continuous production.

Referring now specifically to FIGS. 4 and 5, the functioning of the re-resination Station H is illustrated in detail.

The partially treated blanket 52 which is sandwiched between upper and lower belts 54 and 56 enters the impregnator die assembly, indicated generally at 66, at the re-resination Station H. The die assembly includes upper die 68 and lower die 70 which are secured to one another by bolts 72, 74. A shim or other spacing means is indicated at 76 for purposes of adjusting the spacing between the die halves. It will be understood that the left edge of both upper die 68 and lower die 70 have been chamfered, as at 78 and 80, respectively, see FIG. 5, to facilitate entry of the sandwich to the die assembly 66. Similar chamfers are indicated at 82, 84 which enable the die to be installed in either direction. The upper die 68 has an internal recess 86 formed therein and the bottom die 70 has a mating, internal recess 88. The recesses 86, 88 form a plenum chamber 90 (see FIG. 5). Preferably the width of the plenum chamber 90 corresponds to the width of the sandwiched blanket 52, as best seen in FIG. 4, so there is no fluid leakage around the edges of the sandwiched blanket when the blanket moves through the chamber in the direction of the arrow 92 of FIG. 5. The edges of the interior surface of the internal walls of the recesses are chamfered as at 94, 96 and 98, 100 to facilitate smooth reception of the sandwiched blanket irrespective of the direction of movement of the sandwich through the die assembly 66.

An entry conduit through which resin suspended in a fluid, such as an aqueous medium, passes is indicated at 102. The terminal end 104 of the entry conduit opens into the lower portion of chamber 90. An exhaust conduit for resin and its carrier is indicated at 106, the entry end 108 of the exhaust conduit being in fluid communication with the upper portion of chamber 90. Anchor blocks for the resin conduits are indicated at 110, 112.

It will be understood that when the sandwich of the belts 54, 56 and blanket 52 passes through the plenum chamber 90 with the edges of the sandwich in sliding contact with the side walls 114, 116 of the chamber 90, see FIG. 4, resin and its fluid carrier will be admitted under pressure from a nearby source, described hereinafter, and directed into the entry conduit 102 in the direction of the arrow 118. The resin entrained in the fluid will be, in effect, driven through the lower porous filter belt 56, then the blanket 52, and then the upper porous filter belt 54. A portion of the pressurized resin will be retained on the blanket 52 with a consequent increase in the weight of resin per unit area of blanket as contrasted to the entry weight per unit of area. Preferably the weight is increased to an amount in excess of the amount which is desired in the final product. The resin which is not retained on the blanket 52 passes into the upper portion of the plenum chamber 90 and then exits the die assembly through exhaust conduit 106 along with associated carrier fluid.

The operation of a typical vacuum stripper is illustrated in FIG. 6. The blanket 53, which now contains excess resin, together with the upper and lower filter cloths 54 and 56 enters the stripper while moving in the direction of the horizontal arrow 120. The stripper consists essentially of a left side frame member, indicated generally at 122 and a right side frame member, indicated generally at 124. The frame members include downwardly extending extension members 126, 128, which form between them an exhaust conduit or chamber 129 connected to a suitable source of vacuum which pulls a vacuum in the direction of the vertical arrow 130 in FIG. 6. The frame members include upper plates 132, 134 whose flat, planar upper surfaces form a bed over which the blanket sandwich slides as it passes through the stripper. A back up member providing a blocking surface, in this instance a drum, is indicated at 136, the drum having a solid surface and a diameter large enough so that when the bottom of the drum is in contact with the upper side of filter cloth belt 54 there will be (a) only a slight depression of the sandwich, if any, and (b) a blocking surface or barrier to the passage of fluids in the area where drum-belt contact is formed. Preferably also the drum-belt contact area is at least as wide as the span between the inner edges of slide plates 132, 134 and directly aligned with the inlet 135 of the exhaust conduit 129. The constituents of the belts and the fibers on either side of the exhaust conduit 129 form a barrier to the dissipation of the vacuum and hence the effect of the vacuum will be confined to that portion of the blanket aligned with exhaust conduit 129. In other words, the belts and the fibers on either side of the exhaust conduit or chamber 129 provide an internal resistance to fluid flow which confine the effect of the vacuum to the portion of blanket aligned with the exhaust conduit or chamber 129. Since the sandwiched blanket is continuously moving across the inlet 135 of the exhaust conduit 129, each increment of the blanket, and hence all droplets of uncured resin and resin carrier in each said increment, will be exposed to the suction action or pressure drop of the vacuum provided at the inlet 135 of the exhaust conduit or chamber 129. Other techniques of producing a pressure drop across the upper surface 136 and lower surface of the re-resinated blanket 53 will be apparent to those skilled in the art. One such technique would be blow the excess resin out of the blanket as opposed to using a vacuum.

Referring now to Station H in FIG. 1 a binder recirculation system is there shown. Binder which is not retained by the blanket 52 as the blanket 52 moves through the impregnator die assembly 66 leaves the die assembly 66 via exhaust conduit 106 as earlier described. Exhaust conduit 106 carries the non-retained binder via suitable piping to a binder catch pan 138 as seen in FIG. 1. After collection in the bottom of the catch pan the recirculated resin enters pump 140 which discharges the resin into resin entry conduit 102 which, as above-described, terminates in the plenum chamber 90 (see FIGS. 4, 5). Returning to FIG. 1, a binder supply tank is indicated at 142, the flow of binder from the tank 142 into catch pan 138 being regulated by any well-known means which senses a low level of resin in the catch pan 138 and sends a signal which opens and closes a flow control valve in make up line 144.

FIG. 7 is a diagrammatic illustration of the process of the present invention as practiced continuously, specifically eliminating Stations D, E, F and G. However, it will be understood that, as an alternative the cutting Station D could easily be located between Stations C and H.

Although only two preferred embodiments of the invention have been illustrated and described, it will be apparent to those skilled in the art that modifications may be made within the spirit and scope of the invention. Accordingly it is intended that the scope of the invention be limited solely by the scope by the hereinafter appended claims when interpreted in light of the relevant prior art, and not by the foregoing exemplary description.

What is claimed is:

1. An apparatus for producing a fiberglass product, the apparatus comprising:

a forming station for forming glass fibers into a fiberglass pack, the forming station including means for adding a first amount of binder to the fiberglass pack to form a partially bindered fiberglass pack, the first amount of binder being less than a final desired amount of binder required in the fiberglass product, first conveying means for transporting the partially bindered fiberglass pack to a means for curing the partially bindered fiberglass pack, means for curing the partially bindered fiberglass pack to form a cured blanket, second conveying means for transporting the partially bindered fiberglass pack through the means for curing, third conveying means for moving the cured blanket through a post curing supplemental binder application means, ¶ the third conveying means including porous belts having an upper belt and a lower belt with the cured blanket sandwiched therebetween, ¶ the upper belt and the lower belt having a porosity sufficient to permit a second amount of binder to be added to the blanket by passing the binder through one of the belts to impregnate the blanket, the post curing supplemental binder application means being arranged to add the second amount of binder to the cured blanket which, in combination with the first amount, is in excess of the final desired amount required in the fiberglass product, ¶ the post curing supplemental binder application means further including (a) a plenum chamber, and (b) means for forcing binder through one of the belts of the third conveying means and into the blanket by pressurized fluid, the binder being entrained in the pressurized fluid in the plenum chamber, means for stripping binder in excess of the final desired amount required in the blanket, fourth conveying means for transporting the blanket through a means for removing excess moisture, and means for removing excess moisture from the blanket without curing that portion of the second amount of binder which remains in the blanket.

2. The apparatus of claim 1, wherein the means for stripping binder comprises a vacuum including at least one vacuum chamber having a vacuum inlet over which the blanket containing excess binder, the upper belt and the lower belt passes.

3. The apparatus of claim 2 further including means for enhancing the vacuum, said vacuum enhancing means including (a) a blocking surface in contact with the belt disposed on the opposite side of the blanket from the vacuum inlet, and (b) an internal resistance to fluid flow provided by the upper belt, the blanket, and the lower belt in the regions flanking the blocking surface and the vacuum inlet.

4. The apparatus of claim 11, wherein the means for removing excess moisture is an electronic heating means.

5. The method of claim 4, wherein the electronic heating means comprises a microwave heating apparatus.

6. An apparatus for producing a fiberglass product, the apparatus comprising:

a forming station for forming glass fibers into a fiberglass pack, the forming station including means for adding a first amount of binder to the fiberglass pack to form a partially bindered fiberglass pack, the first amount of binder being less than a final amount of binder required in a final product, means for curing the partially bindered fiberglass pack to form a cured blanket, a conveyor for moving the blanket to a post curing supplemental binder application means, the conveyor including an upper porous belt and a lower porous belt with the cured blanket sandwiched therebetween, the upper belt and the lower belt having a porosity sufficient to permit a second amount of binder in excess of the amount required to be added to the blanket by passing the binder through one of the belts to impregnate the blanket, vacuum means for stripping binder in excess of the final amount from the blanket, the vacuum means including at least one vacuum chamber having a vacuum inlet over which the blanket containing excess binder and the upper belt and the lower belt passes, vacuum enhancing means, said vacuum enhancing means including a blocking surface in contact with the belt disposed on the opposite side of the blanket from the vacuum inlet, and (b) an internal resistance to fluid flow provided by the upper belt, the blanket, and the lower belt in regions flanking the blocking surface and the vacuum inlet, and a microwave heating means for removing excess moisture from the blanket without curing the second binder remaining in the blanket.

7. An apparatus for producing a fiberglass product, the apparatus comprising:

a forming station for forming glass fibers into a fiberglass pack, the forming station including a binder spray for adding a first amount of binder to the fiberglass pack to form a partially bindered fiberglass pack, the first amount of binder being less than a final desired amount of binder required in a fiberglass product, a curing oven for curing the partially bindered fiberglass pack to form a cured blanket, a conveyor for moving the cured blanket to ¶ a re-resinator, ¶ the conveyor including an upper porous belt and a lower porous belt with the cured blanket sandwiched therebetween, the upper belt and the lower belt having a porosity sufficient to permit a second amount of binder to be added to the blanket by passing additional binder in excess of the amount required through one of the belts to impregnate the blanket, means for stripping from the blanket that amount of binder which is in excess of the final amount required in the blanket, ¶ said means for stripping including at least one low pressure inlet over which the blanket containing excess binder, the upper belt, and the lower belt passes, said excess binder being drawn into said low pressure inlet, and means for removing excess moisture from a blanket without curing the second binder remaining in the blanket.

* * * * *